US012641596B2

(12) United States Patent (10) Patent No.: US 12,641,596 B2
Chen et al. (45) Date of Patent: May 26, 2026

(54) UL TDM CARRIER AGGREGATION

(71) Applicant: QUALCOMM Incorporated, San Diego, CA (US)

(72) Inventors: Bo Chen, Beijing (CN); Mingkai Nan, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 17/926,562

(22) PCT Filed: Jul. 14, 2020

(86) PCT No.: PCT/CN2020/101836
§ 371 (c)(1),
(2) Date: Nov. 18, 2022

(87) PCT Pub. No.: WO2022/011543
PCT Pub. Date: Jan. 20, 2022

(65) Prior Publication Data
US 2023/0199755 A1 Jun. 22, 2023

(51) Int. Cl.
*H04W 72/1268* (2023.01)
*H04L 5/14* (2006.01)
(Continued)

(52) U.S. Cl.
CPC ........... *H04W 72/1268* (2013.01); *H04L 5/14* (2013.01); *H04W 72/51* (2023.01); *H04W 72/566* (2023.01)

(58) Field of Classification Search
CPC ............. H04W 72/1268; H04W 72/51; H04W 72/566; H04L 5/14
See application file for complete search history.

(56) References Cited

U.S. PATENT DOCUMENTS

| | | | | |
|---|---|---|---|---|
| 10,440,712 B1 * | 10/2019 | Fang | ................. | H04W 72/0453 |
| 2017/0302419 A1 * | 10/2017 | Liu | ........................ | H04W 72/23 |
| 2017/0331577 A1 | 11/2017 | Parkvall et al. | | |

FOREIGN PATENT DOCUMENTS

| | | | | | |
|---|---|---|---|---|---|
| CN | 111165029 A | * | 5/2020 | ............. | H04W 92/18 |
| CN | 111543015 A | * | 8/2020 | .......... | H04W 52/146 |

(Continued)

OTHER PUBLICATIONS

International Search Report and Written Opinion—PCT/CN2020/101836—ISA/CN—Mar. 31, 2021.
China Telecom. "R1-2001275 [100e-5.1LS-TxSwitching-03] Email discussion/approval on remaining issues on inter-band UL CA". 3GPP TSG RAN WG1 #100, Mar. 7, 2020 (Mar. 7, 2020), section 2.
Qualcomm Incorporated. "R1-2000949 discussion of UL switching impact". 3GPP TSG RAN WG1 #100-e, Feb. 15, 2020 (Feb. 15, 2020), the whole document.

(Continued)

*Primary Examiner* — Saad A. Waqas
(74) *Attorney, Agent, or Firm* — Harrity & Harrity, LLP

(57) ABSTRACT

A wireless communication in a user device includes configuring a plurality of transmission chains with a plurality of carriers; and uploading data in a time-division duplexed (TDD) or frequency division duplex (FDD) transmission through the plurality of transmission chains. In some embodiments, two transmission chains and two carriers are used for carrier aggregation uplink of data. An apparatus may include a plurality of transmit chains, each of the plurality of transmit chains providing transmission of data using TDD or FDD transmissions; a plurality of antennas, each of the antennas providing transmission of data from one of the plurality of transmit chains into one of a plurality of carriers; and a time-division multiplexed (TDM) switch coupled between the plurality of transmit chains and the plurality of antennas such that each of the plurality of transmit chains transmits data on one of the plurality of carriers.

26 Claims, 9 Drawing Sheets

700

(51) Int. Cl.
　　*H04W 72/51*　　　(2023.01)
　　*H04W 72/566*　　(2023.01)

(56) References Cited

FOREIGN PATENT DOCUMENTS

| | | | | | |
|---|---|---|---|---|---|
| JP | 7010936 | B2 | * | 2/2022 | ........... H04W 24/10 |
| KR | 20210036346 | A | * | 4/2021 | |
| WO | 2014204202 | A1 | | 12/2014 | |
| WO | WO-2019242679 | A1 | * | 12/2019 | ............... H04B 1/18 |
| WO | WO-2020028366 | A1 | * | 2/2020 | ........... H04L 5/0094 |

OTHER PUBLICATIONS

Supplementary European Search Report—EP20944940—Search Authority—The Hague—Mar. 12, 2024.

Huawei, et al., "New WID Proposal: RF Requirements Enhancement for NR Frequency Range 1 (FR1) in Rel-17", 3GPP TSG RAN Meeting #88e, RP-200614 (Revision of RP-20xxxx), Electronic Meeting, Jun. 29, 2020-Jul. 3, 2020, 5 Pages, Jun. 23, 2020.

Qualcomm Incorporated: "Discussion of UL Switching Impact", 3GPP TSG RAN WG1 #100-e, R1-2001219, Feb. 24, 2020-Mar. 6, 2020, Mar. 6, 2020, 11 Pages, Feb. 28, 2020, The Whole Document.

* cited by examiner

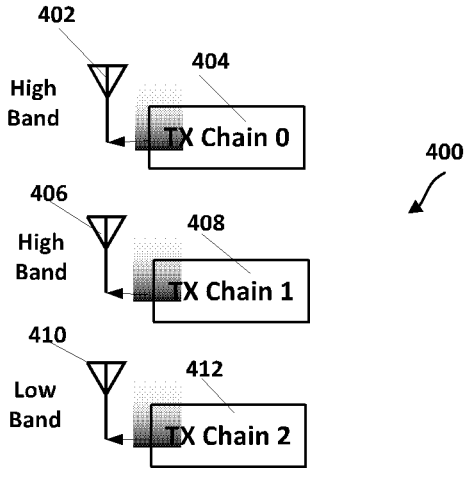
FIG. 4A
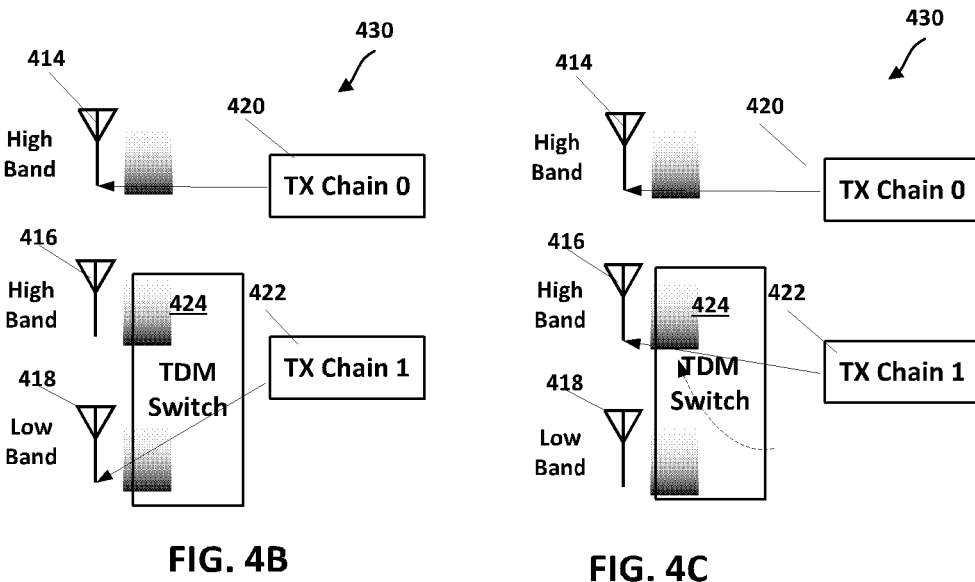
FIG. 4B          FIG. 4C

800

802

Provide capabilities to a BS

804

Receive indication of UL case

806

Identify the indicated case

808

Configure UL transmission according to the indicated case

810

Transmit data

820

822

Receive UE capabilities

824

Provide indication of UL cases to UE

826

Receive data according to the UE UL case

UL TDM CARRIER AGGREGATION

RELATED APPLICATIONS

The present application is a 35 U.S.C. 371 National Phase entry of and claims priority to International Patent Application No. PCT/CN2020/101836, filed in China on Jul. 14, 2020, which is hereby incorporated by reference in its entirety.

TECHNICAL FIELD

This application relates to wireless communication systems, and more particularly to up-link (UL) time-division-multiplexing (TDM) carrier aggregation (CA).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Aggregating spectra typically involves aggregating transmission from various transmission bands, which is referred to as Carrier Aggregation (CA). The various bands are designated by uplink and downlink frequencies and duplex modes, for example. It is important to optimize data transfer with systems that employ CA under various network configurations.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure a method of wireless communication in a user device includes receiving an indication of an uplink transmission consistent with capabilities of the user device; determining a configuration consistent with the indication; configuring a plurality of transmission chains with corresponding carriers; and transmitting data through the plurality of transmission chains. In some embodiments, two transmission chains and two carriers are used for carrier aggregation (CA) uplink (UL) of data using TDD or FDD transmission.

An apparatus according to some embodiments includes a plurality of transmit chains, each of the plurality of transmit chains providing transmission of data using TDD or FDD transmission; a plurality of antennas, each of the antennas providing transmission of data from one of the plurality of transmit chains into one of a plurality of carriers; and a time-division multiplexed (TDM) switch coupled between the plurality of transmit chains and the plurality of antennas such that each of the plurality of transmit chains transmits data on one of the plurality of carriers.

Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIGS. 4A, 4B, and 4C illustrate Uplink (UL) Carrier Aggregation (CA) and time division multiplexed (TDMed) UL CA.

DETAILED DESCRIPTION

Figure 1:
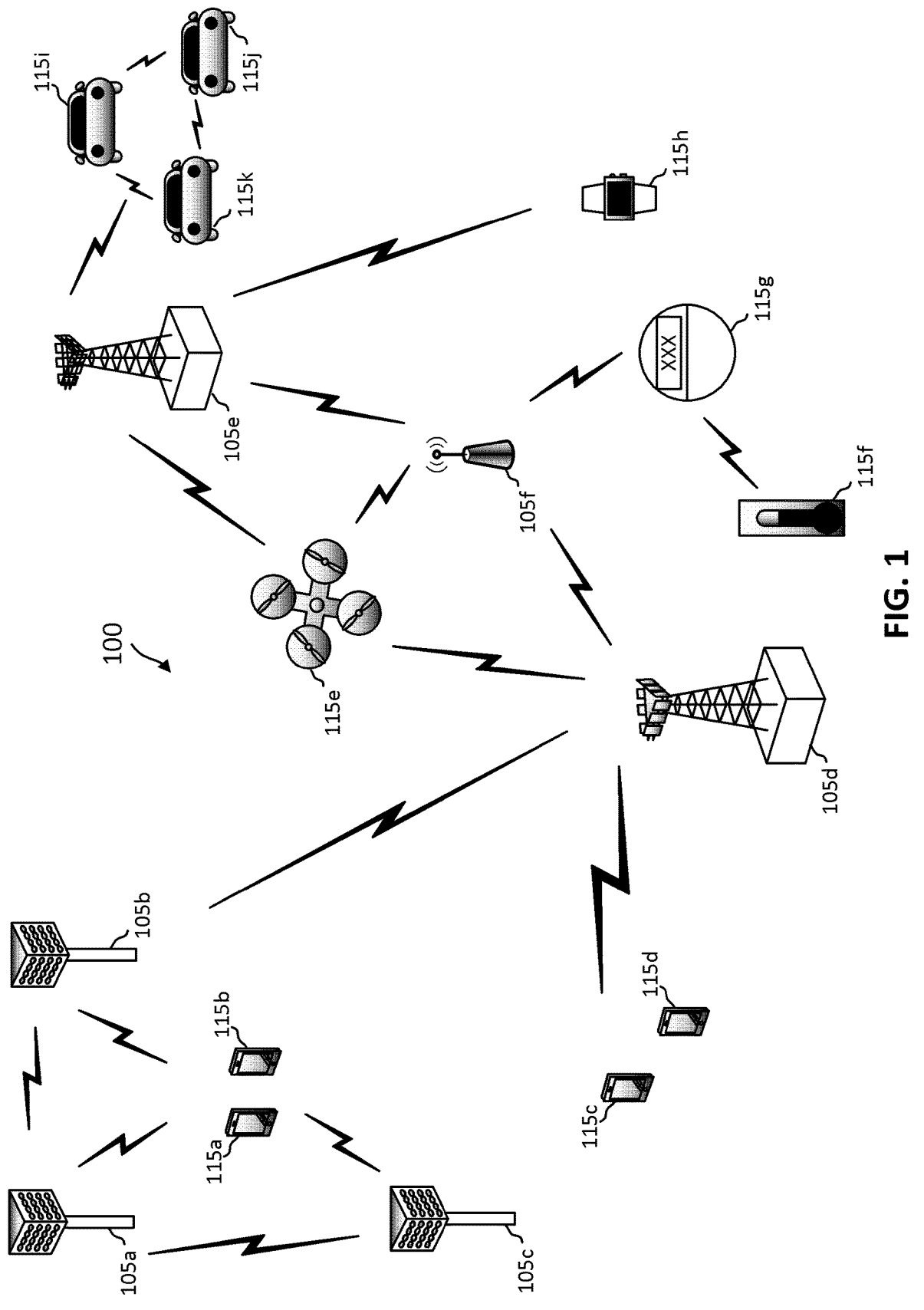
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time intervals (TTIs); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHZ, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mm Wave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Embodiments of the present invention relate to TDD+ TDD UL time-division multiplexed (TDM) carrier aggregation (CA) systems. In some embodiments, a two transmission chain system that allows for two-ranked TDD transmission on each transmission chain is provided. In particular, the TDD-FDD TDMed CA UL of data is replaced with a TDD–TDD TDMed CA UL. This allows for 2-ranked TDD UL on each transmission chain.

Various aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (COMP) or multi-connectivity. The macro BS 105*d* may perform backhaul communications with the BSs 105*a*-105*c*, as well as with the small cell, the BS 105*f*. The macro BS 105*d* may also transmit multicast services which are subscribed to and received by the UEs 115*c* and 115*d*. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

Figure 2:
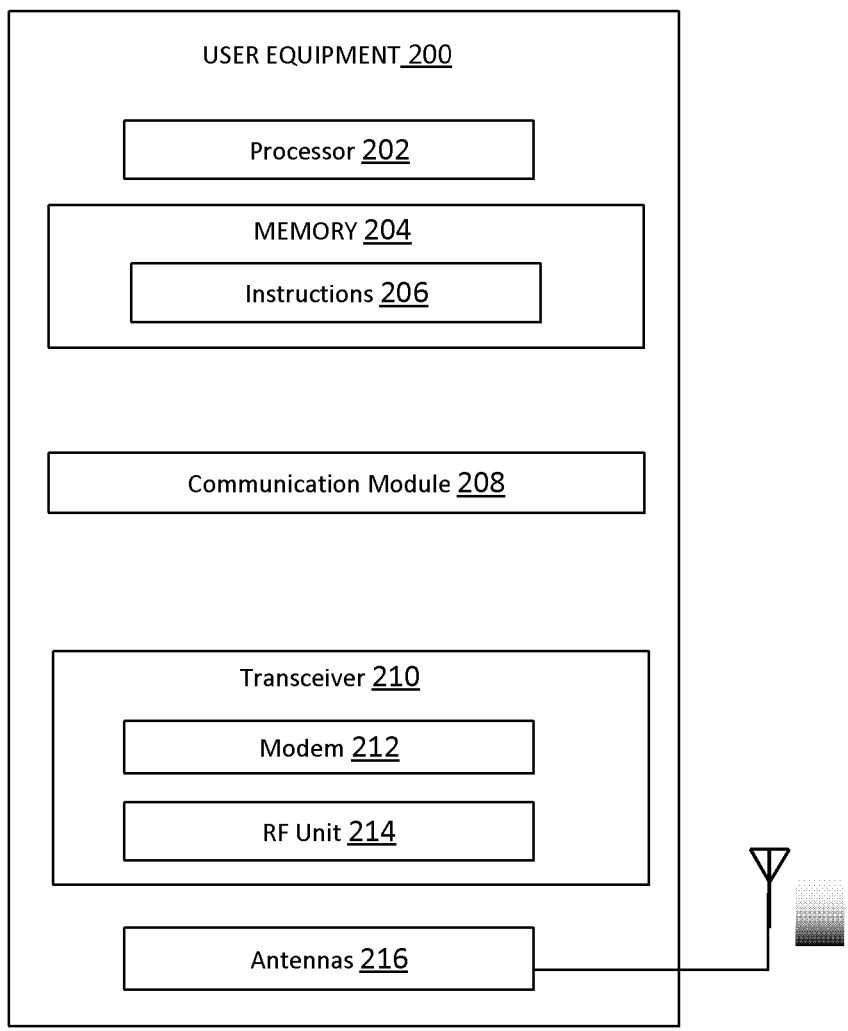
FIG. 2 is a block diagram of an example user equipment (UE) according to embodiments of the present disclosure.

FIG. 2 is a block diagram of an example UE 200 according to embodiments of the present disclosure. The UE 200 may be a UE 115 as discussed above. As shown, the UE 200 may include a processor 202, a memory 204, a communication module 208, a transceiver 210 including a modem subsystem 212 and a radio frequency (RF) unit 214, and one or more antennas 216. These elements may be in direct or indirect communication with each other, for example via one or more buses.

The processor 202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 202 may also be implemented as a combination of computing devices, e.g., a combination of a DSP and a microprocessor, a plurality of microprocessors, one or more microprocessors in conjunction with a DSP core, or any other such configuration.

The memory 204 may include a cache memory (e.g., a cache memory of the processor 202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium. The memory 204 may store instructions 206. The instructions 206 may include instructions that, when executed by the processor 202, cause the processor 202 to perform the operations described herein with reference to the UEs 115 in connection with embodiments of the present disclosure. The instructions 206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 208 may be implemented via hardware, software, or combinations thereof. For example, the communication module 208 may be implemented as a processor, circuit, and/or instructions 206 stored in the memory 204 and executed by the processor 202.

The communications module 208 may be configured to package uplink (UL) data within a predetermined frame structure or receive downlink (DL) data with a frame structure. The predetermined frame structure is set to transmit and receive data through network 100. The communication module 208 may be configured to transmit and receive data between UE 200 and a BS according to the predetermined frame structure. The predetermined frame structure can be a time division duplexing (TDD) or frequency division duplexing (FDD) structure and includes uplink and downlink slots for uploading and downloading data.

In some embodiments, communications module 208 and transceiver 210 may form one or more transmission chains. Each transmission chain is mapped to antennas configured in communications module 208 and transceiver 210 to transmit data using a corresponding component carrier in one or more transmission bands, as is discussed further below. In particular, embodiments of the present invention allow for a plurality of transmission chains coupled to be switched between a plurality of carriers using TDD transmission. In one specific example, two transmission chains are coupled through a time division multiplexed (TDM) switch to a plurality of carriers to provide carrier aggregation (CA) UL transmission, which may be either TDD or FDD transmission.

As shown, the transceiver 210 may include the modem subsystem 212 and the RF unit 214. The transceiver 210 can be configured to communicate bi-directionally with other devices, such as the BSs 105 and/or another core network element. The modem subsystem 212 may be configured to modulate and/or encode the data from the memory 204 and/or the communication module 208 according to a modulation and coding scheme (MCS), e.g., a low-density parity check (LDPC) coding scheme, a turbo coding scheme, a convolutional coding scheme, a digital beamforming scheme, etc., and in accordance with the predetermined frame structure. The RF unit 214 may be configured to process (e.g., perform analog to digital conversion or digital to analog conversion, etc.) modulated/encoded data from the modem subsystem 212 (on outbound transmissions) or of transmissions originating from another source such as a UE or a BS 105. The RF unit 214 may be further configured to perform analog beamforming in conjunction with the digital beamforming. Although shown as integrated together in transceiver 210, the modem subsystem 212 and the RF unit 214 may be separate devices that are coupled together at the UE 200 to enable the UE 200 to communicate with other devices.

The RF unit 214 may provide the modulated and/or processed data, e.g. data packets (or, more generally, data messages that may contain one or more data packets and other information), to the antennas 216 for transmission to one or more other devices. The antennas 216 may further receive data messages transmitted from other devices. The antennas 216 may provide the received data messages for processing and/or demodulation at the transceiver 210. The antennas 216 may include multiple antennas of similar or different designs in order to sustain multiple transmission links. The RF unit 214 may configure the antennas 216.

Figure 3:
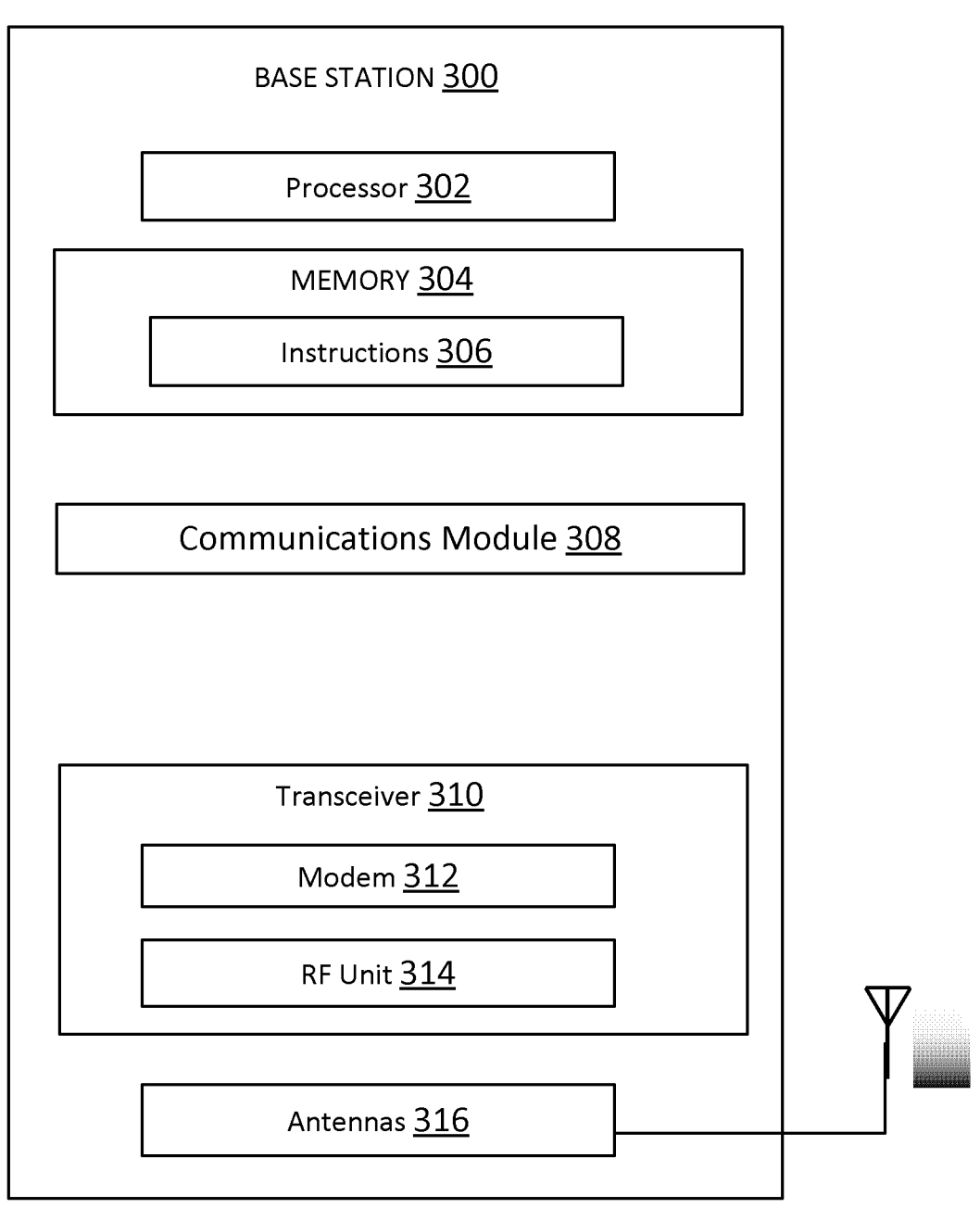
FIG. 3 is a block diagram of an example base station (BS) according to embodiments of the present disclosure.

FIG. 3 is a block diagram of an example BS 300 according to embodiments of the present disclosure. The BS 300 may be a BS 105 as discussed above. As shown, the BS 300 may include a processor 302, a memory 304, a communication module 308, a transceiver 310 including a modem subsystem 312 and a RF unit 314, and one or more antennas 316. These elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some embodiments, the memory 304 may include a non-transitory computer-readable medium. The memory 304 may store instructions 306. The instructions 306 may include instructions that, when executed by the processor 302, cause the processor 302 to perform operations described herein. The instructions 306 may also be referred to as code, which may be interpreted broadly to include any type of computer-readable statement(s) as discussed above with respect to FIG. 2.

The communication module 308 may be implemented via hardware, software, or combinations thereof. For example, each of the frame module 307 and the communication module 308 may be implemented as a processor, circuit, and/or instructions 306 stored in the memory 304 and executed by the processor 302.

The communications module 308 may be configured to prepare or receive data into a predetermined frame structure or retrieve data according to a predetermined frame structure in order to send and receive data. The predetermined frame structure can be a time division duplexing (TDD) or frequency division duplexing (FDD) structure and includes slots for uplink and downlink data.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or another BS. The RF unit 314 may be further configured to perform analog beamforming in conjunction with the digital beamforming. Although shown as integrated together in transceiver 310, the modem subsystem 312 and/or the RF unit 314 may be separate devices that are coupled together at the BS 300 to enable the BS 300 to communicate with other devices.

The RF unit 314 may provide the modulated and/or processed data, e.g. data packets (or, more generally, data messages that may contain one or more data packets and other information), to the antennas 316 for transmission to one or more other devices. This may include, for example, transmission of information to complete attachment to a network and communication with a camped UE 115 or 200 according to embodiments of the present disclosure. The antennas 316 may further receive data messages transmitted from other devices and provide the received data messages for processing and/or demodulation at the transceiver 310. The antennas 316 may include multiple antennas of similar or different designs in order to sustain multiple transmission links.

In an embodiment, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, 10 slots per frame. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the slots (e.g., DL slots) in a radio frame may be used for DL transmissions and another subset of the slots (e.g., UL slots) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs)

and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. AN UL-centric subframe may include a longer duration for UL communication than for DL communication.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a physical DL control channel (PDCCH). The BS 105 may transmit a DL communication signal to the UE 115 via a physical DL shared channel (PDSCH) according to a DL scheduling grant. The UE 115 may transmit an UL communication signal to the BS 105 via a physical UL shared channel (PUSCH) and/or physical UL control channel (PUCCH) according to an UL scheduling grant.

Frame structures for various transmission bands can be defined for communication between UE 115 and BS 105. In particular, NR defines operating bands within specified frequency range. For example, within the frequency range of 450 MHZ-6000 MHZ (FR1), NR defines a series of operating bands that operate in FDD mode (N1, N2, N3, N4, N7, 8, N12, N20, N25, N28, N70, N71), TDD mode (N34, N38, N39, N40, N41, N51, N77, N78, N79), supplemental downlink mode SDL (N75, N76), or supplemental uplink mode SUL (N80, N81, N82, N83, N84, and N86). Within the frequency range of 24250 MHZ-526500 MHZ, several TDD mode bands are defined (N257, N258, N260, and N261). A transmission implementation will define a particular operating band or set of operating bands for communications between UE 115 and a BS 105. Furthermore, particular frame structures are adopted to provide for UL and DL functionality with respect to the adopted operating band. One skilled in the art will recognize that embodiments according to this disclosure can include various definition of transmission bands and frame structures.

FIG. 4A illustrates a particular UL carrier aggregation configuration 400 that can be implemented in UE 200. As illustrated in FIG. 4A, configuration 400 illustrates three transmit chains—TX chain 0 404, and TX chain 1 408. TX chain 0 404 is coupled to antenna 402 configured to transmit on a high band. TX chain 1 408 is coupled to antenna 406 that is also configured to transmit on a high band. TX chain 2 412 is coupled to antenna 410 that is configured to transmit on a low band. As discussed above, each of TX chains 404, 408, and 412 is implemented between communications module 208 and transceiver 210 illustrated in FIG. 2 while antennas 402, 406, and 410 are implemented in antennas 216 illustrated in FIG. 2.

Configuration 400 illustrated in FIG. 4A illustrates a configuration that can be used for UL CA and supports three concurrent transmissions simultaneously. As illustrate in FIG. 4A, one data stream can be uploaded on the low band represented by TX chain 412 and antenna 410 while two data streams are uploaded on high bands represented by TX chain 404 coupled to antenna 402 and TX chain 408 coupled to antenna 406. However, configuration 400 requires three transmit chains to achieve, which increases the expense and component cost of UE 200 when configuration 400 is implemented. Because of the added expense, configuration 400 is rarely implemented.

FIGS. 4B and 4C illustrate a time division multiplexed (TDMed) UL CA (TDD+FDD TDMed UL CA) configuration 430. FIG. 4B illustrates a first case of configuration 430 and FIG. 4C illustrates a second case of configuration 430. Configuration 430 supports two concurrent transmissions represented by TX chain 0 420 and TX chain 1 422, which reduces the number of requirement minimum TX chains from three to two.

As is illustrated in the case of FIG. 4B, TX chain 0 420 is coupled to antenna 414, which is a high band carrier transmission. TX chain 1 422 is coupled to antenna 418, which is a low band carrier transmission. In the case of FIG. 4C, TX chain 1 422 is switched to antenna 416, which is a high band carrier transmission, by a TDM switch 424. Configuration 430 is switched between the case illustrated in FIG. 4B and the case illustrated in FIG. 4C.

In TDD+FDD CA (or dual connectivity (DC) or supplemental uplink (SUL)), UE 200 has only two TX chains as illustrated in FIGS. 4B and 4C. This only supports 1 FDD UL carrier (up to rank 1) and 1 TDD UL carrier (up to rank 2). In this context, the rank indicates the number of layers in the uplink data transmission. As discussed above, two cases are defined with configuration 430 as indicated in the following table:

| Case 1 | 1 TX chain on carrier 1 and 1 TX chain on carrier 2 |
| Case 2 | 0 TX chain on carrier 1 and 2 TX chain on carrier 2 |

Carrier 1 refers to low band transmission on antenna 418 and carrier 2 refers to high band transmission on antennas 414 or 416. FIGS. UE 200 can switch between case 1 and case 2 according to Radio Resource Control (RRC) signals.

Figure 5A:
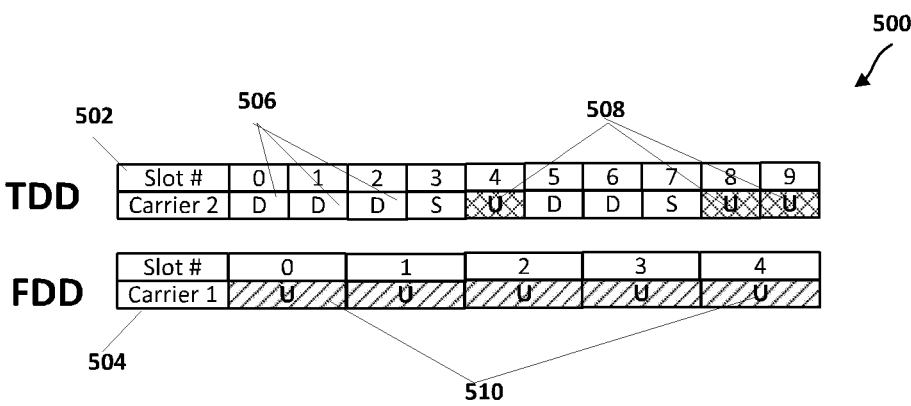
FIGS. 5A and 5B illustrate uplink diagrams illustrating two cases as illustrated in the TDMed UL CA configuration of FIGS. 4B and 4C.
Figure 5B:
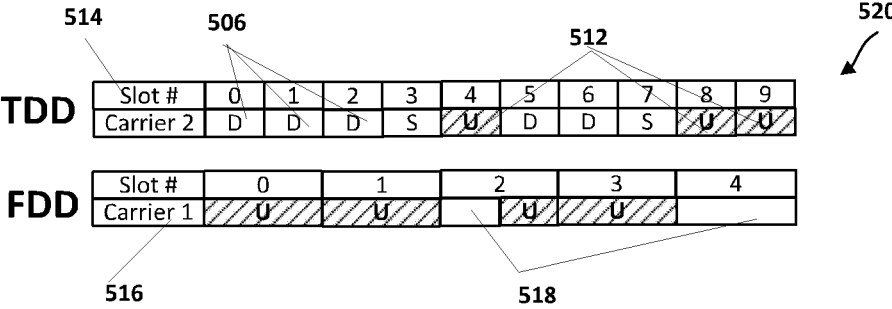

FIGS. 5A and 5B illustrate operation of the frame structures for data transmissions in configuration 430 as illustrated in FIGS. 4B and 4C. As illustrated in FIG. 5A, frame 502 is provided TX chain 0 420, carrier 2 (high band), and frame 504 on TX chain 1 422 on carrier 1 (low band). Frame 502 is a TDD frame while frame 504 is a FDD frame. As illustrated in TDD frame 502, the frame structure is "DDD-SUDDSUU." UL slots 508 occur in slots 4, 8 and 9. DL slots 506 are in slots 0-2 and 5-6. FDD frame on carrier 1 illustrate all uplink slots. As is illustrated, TDD UL slots 508 in TDD frame 502 is single component carrier (CC) with one transmit chain. FDD UL slots 510 have a single rank 1 carrier.

FIG. 5B illustrates the second case, with both transmit chains 420 and 422 are coupled to high band antennas on carrier 2. TDD frame 514 is on TX chain 0 420. When in case 2 of FIG. 4C, TDD frame 514 is also on TX chain 1 422. FDD frame 516 operates on TX chain 1 422 coupled to the low band carrier when case 1 is activated. As illustrated in FIG. 5B, during slots 4, 8, and 9 of TDD frame 514, frame 514 is directed on both TX chain 0 420 and TX chain 1 422 on high band, carrier 2, where UL slots 512 are active and slots 518 in FDD frame 516 are not activated. UL slots 512 support full rank transmission. However, neither case allows for TDD+TDD CA where up to two rank transmission is supported on both TDD carriers.

In accordance with some embodiments of the present invention, TDD+TDD TDMed UL CA is presented. In particular, a plurality of TX chains each providing TDD transmission can be coupled to a plurality of carriers by a TDM switch. In the particular examples provided below, embodiments that use two transmission chains and two carriers are described. However, one skilled in the art will recognize that more than two transmission chains providing TDD transmission of up to rank 2 each over more than two carriers is provided.

In particular examples described here, TDD is used through each of two transmission chains. Meanwhile, the transmission chains can be switched between a carrier 1 operating on low band antennas and carrier 2 operating on high band antennas. In accordance with some embodiments, UE 200 has the capability of TX chain switching between two TDD carriers with up to rank 2 transmission on both TDD carriers. In other examples, an FDD carrier can continue to be used. In the example disclosed here, two options for implementation are presented. In option 1, the cases are limited to both TX chains operating on either of carrier 1 and carrier 2 with switching capability between the two cases. In an option 2, UE 200 has the capability of TX switching between a first case with both TDD TX chains on carrier 1, a second case with both TDD TX chains on carrier 2, and a third case with one TDD TX chain on carrier 1 and one TDD TX chain on carrier 2. In a setup step, UE 200 reports during capability signaling its support of uplink TX switching among two TDD carriers with up to rank 2 for each of the TDD carriers. UE 200 further reports capability between option 1 and option 2 as described here, and therefore switching between the three cases available on option 2.

UE 200 can receive an indication from BS 300, based on the capabilities that UE 200 has reported, to switch to one of the cases available in either option 1 or option 2. BS 300 may provide signals to switch UE 200 between cases of the options supported on UE 200 at any time. When the indication of case is received, then UE 200 can switch to the requested case. These cases and options are further described below with respect to FIGS. 6A and 6B illustrating option 1 and FIGS. 7A, 7B, and 7C illustrating option 2.

As discussed above, TX chains and a TDM switch can be implemented in hardware or in software on processor 202 of UE 200. Antennas are driven by transceiver 210 to transmit data as described below. Therefore, in the description below, each of the operations may be carried out by processors executing instructions. Consequently, such instructions may be stored in a computer-readable medium.

Figure 6A:
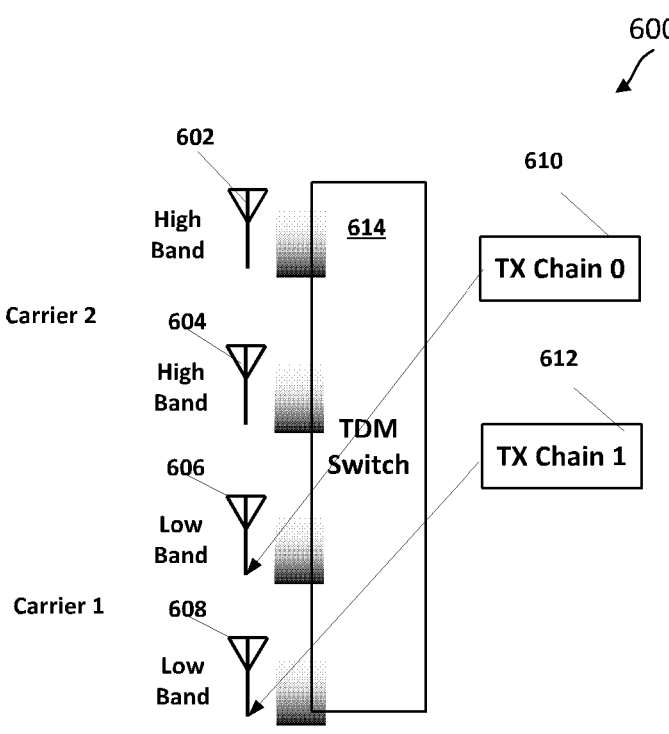
FIGS. 6A and 6B illustrate a configuration according to some embodiments described in this disclosure.
Figure 6B:
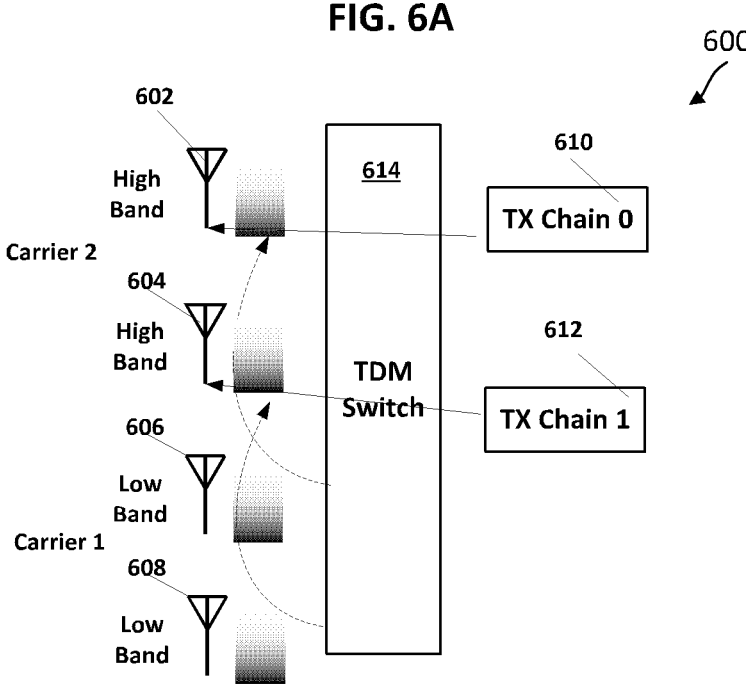
Figure 7A:
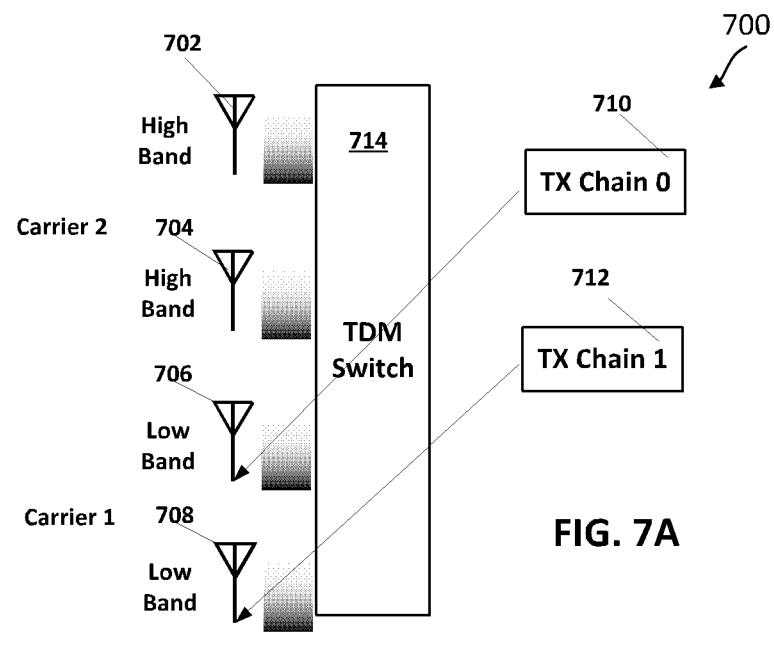
FIGS. 7A, 7B, and 7C illustrate a configuration according to some embodiments described in this disclosure.
Figure 7B:
Figure 7B:
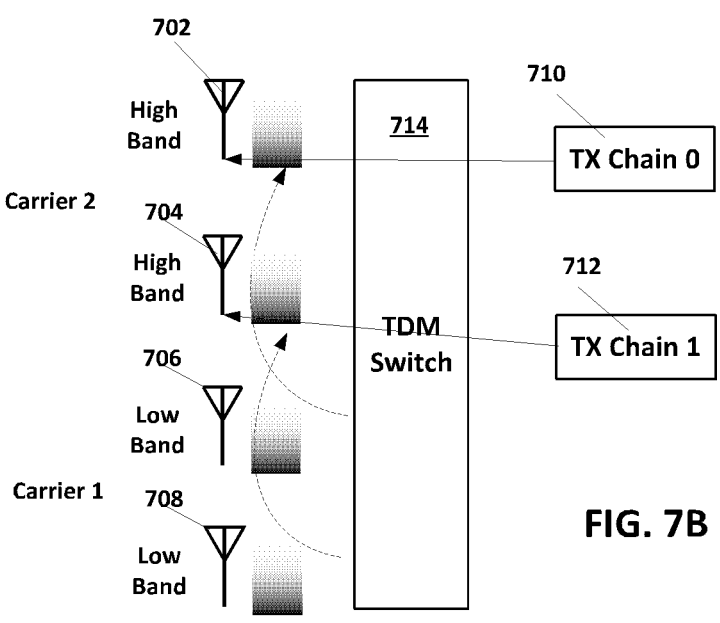
Figure 7C:
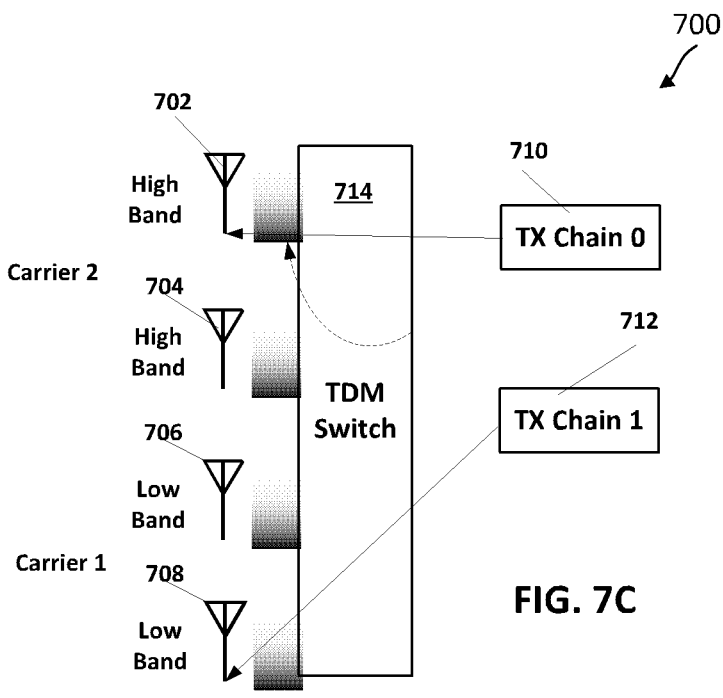

FIGS. 6A and 6B illustrate UE 200 configuration 600 according to embodiments implementing option 1. As illustrated in FIGS. 6A and 6B, configuration 600 illustrates two transmit chains, TX chain 0 610 and TX chain 1 612, and four antennas, antennas 602, 604, 606, and 608. Antennas 602 and 604 are high band antennas operating as carrier 2. Antennas 606 and 608 are low band antennas operating as carrier 1. Both TX chains 610 and 612 are TDD operations with each up to rank 2 for both carriers. A TDM switch 614 allows configuration 600 to operate in one of two cases: case 1 and case 2. In particular, UE 200 can operate both TX chains 610 and 612 in the low band carrier 1 or the high band carrier 2. The choice can be dictated by the network transmission environment.

FIG. 6A illustrates a first case (case 1) where TX chain 610 and TX chain 612 are both coupled to low-band antennas 606 and 608 as carrier 1 by TDM switch 614. FIG. 6B illustrates a second case where TX chain 610 and TX chain 612 are both coupled to high band antennas 602 and 604 as carrier 2 by TDM switch 614. As each of TX chains are TDD carriers with up to rank 2. Consequently, the following table illustrates the cases included in option 1. In the option 1 configuration table, the antenna ports column indicates the number of virtual ports which also indicates the rank for that transmission. In option 1, there is no simultaneous transmission on the two component carriers (carrier 1 and carrier 2).

| | Option 1 Configuration Table | |
| --- | --- | --- |
| Case | TX chain configuration (carrier 1 + carrier 2) | Antenna Ports for UL Transmission (carrier 1 + carrier 2) |
| 1 | 2Tx + 0Tx | 2P + OP, 1P + OP |
| 2 | 0Tx + 2Tx | OP + 2P, OP + 1P |

FIGS. 7A, 7B, and 7C illustrate configuration 700 for option 2. Similar to configuration 600 illustrates in FIGS. 6A and 6B, configuration 700 also includes two TX chains, TX chain 0 710 and TX chain 1 712, and four antennas 702, 704, 706, and 708. Antennas 702 and 704 are configured for high band transmission on carrier 2. Antennas 706 and 708 are configured for low band transmission on carrier 1. TDM switch 714 allows TX chain 0 710 and TX chain 1 712 to be coupled to carrier 1 or carrier 2 transmissions.

FIG. 7A illustrates a first case (case 1) where both TX chain 710 and TX chain 712, each providing TDD transmission, are both coupled to carrier 1 by TDM switch 714. In particular, TX chain 0 710 is coupled to antenna 706 and TX chain 1 712 is coupled to antenna 708. Each of the TDD transmissions can be either rank 1 or rank 2 transmissions.

FIG. 7B illustrates a second case (case 2) where both TX chain 710 and TX chain 712, each providing TDD transmission, are both coupled to carrier 2 by TDM switch 714. In particular, TX chain 0 710 is coupled to antenna 702 and TX chain 1 712 is coupled to antenna 704. Again, each of the TDD transmissions can be either rank 1 or rank 2 transmissions.

FIG. 7C illustrates a third case (case 3) where TX chain 0 710 is set with carrier 2 and TX chain 1 712 is with carrier 1 by TDM switch 714. As such, TX chain 0 710 is coupled to high band antenna 702 (or high band antenna 704) while TX chain 1 712 is coupled to low band antenna 708 (or low band antenna 706).

The following table illustrates the configuration cases for option 2 as illustrated in FIGS. 7A, 7B, and 7C. In option 2, simultaneous transmission on both carrier 1 and carrier 2 is supported in case 3. In option 2, transmission is TDMed by switching between case 1, case 2, and case 3.

| | Option 2 Configuration Table | |
| --- | --- | --- |
| Case | TX chain configuration (carrier 1 + carrier 2) | Antenna Ports for UL Transmission (carrier 1 + carrier 2) |
| 1 | 2Tx + 0Tx | 2P + OP, 1P + OP |
| 2 | 0Tx + 2Tx | OP + 2P, OP + 1P |
| 3 | 1TX + 1 TX | 1P + OP, 1P + 1P, OP + 1P |

In some embodiments of the TDD+TDD TDM CA UL executed by UE 200 as described above, there may be protocols regarding switching of TDM 714 between UL transmissions. If UL is configured for option 2 as illustrated in FIGS. 7A, 7B, and 7C, the state of TX chains 710 and 712 of the last UL transmission as set by TDM switch 714 may exhibit a case of no UL transmission on one carrier and 1-port transmission on the other carrier (0P+1P) or (1P+0P). Since (0P+1P) transmission is supported by both case 2 and case 3 of option 2 and (1P+0P) transmission is supported by both case 1 and case 3 of option 2, the state of transmission should be clarified, but may not trigger TX switching (i.e., the state of TX chains 710 and 712 as defined by TDM switch 714 may be kept unchanged between UL transmissions). Consequently, if the state of TX chains 710 and 712 is in case 1 (2TX+0TX) in the last transmission, it is still in case 1 (2TX+0TX) for the current transmission of (1P+0P). If the state of TX chains 710 and 712 is in case 2 (0TX+2TX) in the last transmission, it is still in case 2 (0TX+2TX) for the current transmission of (0P+1P). Further, if the state of TX chains 710 and 712 is in case 3 (1TX+1TX) in the last transmission, it is still in case 3 (1TX+1TX) for the current transmission of (1P+0P) or (0P+1P).

If UE 200 with TDD_TDD TDM CA is configured for option 1 as illustrated in FIGS. 6A and 6B, which provides case 1 and case 2 mappings between UL antenna transmission ports and TX chains 610 and 612, the switching period of TDM switch 614 is only applicable when the UL transmissions are switched between (2TX, 0) and (0, 2TX). As discussed above, 2TX carrier n refers to UL carriers capable of 2 TX chains with both 1-port and 2-port UL (rank 1 or rank 2) transmission.

IF UE 200 with TDD–TDD TDM CA is configured for option 2 as illustrated in FIGS. 7A, 7B, and 7C, the switching period of TDM switch 714 is applicable in the following cases: 1) If the current state of Tx chains is 2 Tx on carrier 1 and 0Tx on carrier 2 (case 1) and the next UL transmission has a 1-port or 2 ports transmission on carrier 2 (case 2 or 3); 2) If the current state of Tx chains is 0 Tx on carrier 1 and 2Tx on carrier 2 (case 2) and the next UL transmission has a 1-port or 2 ports transmission on carrier 1 (case 1 or case 3); or If the current state of Tx chains is 1 Tx on carrier 1 and 1Tx on carrier 2 (case 3) and the next UL transmission has a 2-port transmission on either carrier 1 or carrier 2 (case 1 or case 2). For other cases, the state of TX chains 710 and 712 in TDM switch 714 of the previous UL transmission is assumed.

For inter-band UL CA, UE 200 is not expected to be scheduled or configured to transmit on any of the two carriers during the switching period. For inter-band TDD+ TDD UL TDM CA, if UL TX switching is configured, UE 200 is not expected to be scheduled or configured with UL transmissions that result in simultaneous 2TX transmissions on carrier 1 and 2TX transmissions on carrier 2 if there are only 2 TX chains.

Figure 8A:
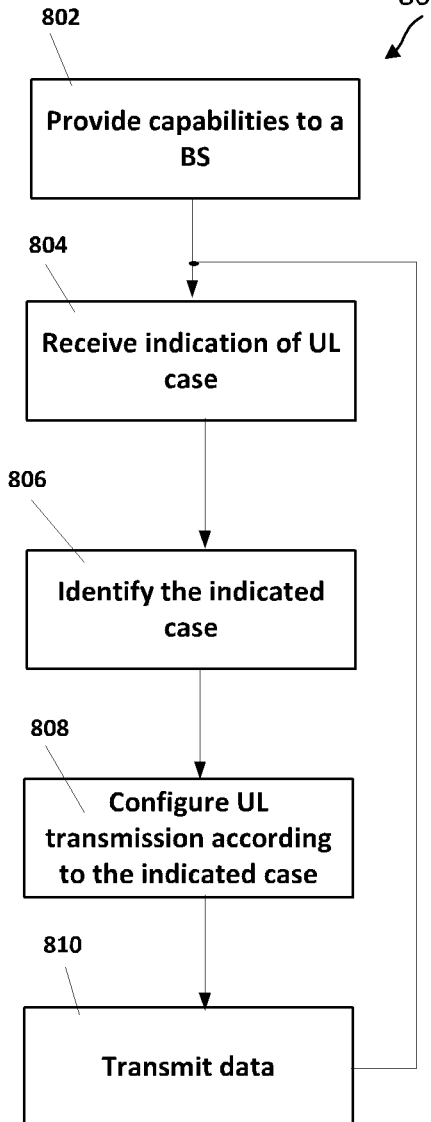
FIG. 8A illustrates a flow chart of implementation of some embodiments according to this disclosure on a UE.

FIG. 8A illustrates instructions 800 executed on UE 200 to implement embodiments according to some embodiments. As illustrated in FIG. 8A, in step 802 UE 200 communicates to a BS 300 its uplink capabilities. In particular, UE 200 can communicate capabilities of executing option 1 cases as illustrated in FIGS. 6A and 6B or option 2 cases as illustrated in FIGS. 7A, 7B, and 7C. Consequently, BS 300 is informed as to whether UE 200 can use a first carrier or a second carrier only (option 1) or whether UE 200 can utilize both the first carrier and the second carrier as well (option 2).

In step 804 of FIG. 8A, UE 200 receives from BS 300 an indication of the UL case to indicate. As discussed above, if UE 200 is capable of option 1 operation, then the indication indicates whether UE 200 should operate in case 1 or case 2 of option 1. If UE 200 is capable of option 2 operation, then the indication indicates whether UE 200 should operation in case 1, case 2, or case 3 of option 2. In step 806, UE 200 identifies the indicated case for UL operation. In step 808, UE 200 configures the UL according to the indicated case. In the examples described above the TDM switch (TDM switch 614 in FIGS. 6A and 6B or TDM switch 714 in FIGS.

7A, 7B, and 7C) is set according to the requested case. As described above, the two carriers used in the cases are either TDD carriers or FDD carriers.

Figure 8B:
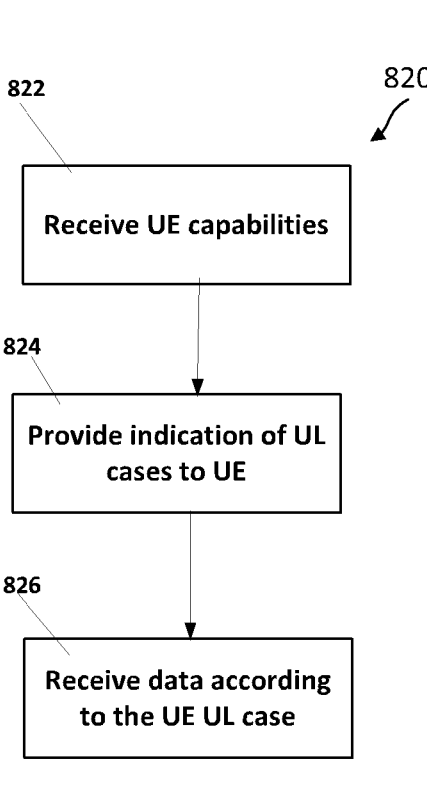
FIG. 8B illustrates a flow chart of implementation of some embodiments according to this disclosure on a BS.

FIG. 8B illustrates operation of BS 300 according to some embodiments. As shown in FIG. 8B, in step 822 BS 300 receives from UE 200 a report of the capabilities of UE 200. In particular, in the example described here, UE 200 indicates whether it operates in option 1 or option 2. In step 824, BS 300 provides an indication to UE 200 regarding a particular configuration. For the example illustrated above, BS 300 provides an indication of whether UE 200 should provide an UL according to case 1 or case 2 of option 1 or, if capable, case 1, case 2, or case 3 of option 2. BS 300 can periodically modify the indication providing in step 824 according to network conditions, in which case as illustrated in FIG. 8A in step 808 UE 200 can switch from one case to another as discussed above. In step 826, BS 300 can receive data according to the UL configuration established in UE 200.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for wireless communication by a user equipment, comprising:

receiving, from a network node, an indication associated with an uplink transmission;

switching, based at least in part on the indication, a first transmission chain and a second transmission chain, between a first uplink carrier and a second uplink carrier, to configure the first transmission chain and the second transmission chain in one of a plurality of transmission chain states, wherein the plurality of transmission chain states defines a quantity of transmission chains assigned to each of the first uplink carrier and the second uplink carrier, wherein the plurality of transmission chain states includes at least two of:

a first transmission chain state in which both the first transmission chain and the second transmission chain are assigned to the first uplink carrier, a second transmission chain state in which both the first transmission chain and the second transmission chain are assigned to the second uplink carrier, or a third transmission chain state in which the first transmission chain is assigned to the first uplink carrier and the second transmission chain is assigned to the second uplink carrier; and transmitting, after the switching, data through the first transmission chain and the second transmission chain.

2. The method of claim 1, wherein the switching is also between different transmission chain states of the plurality of transmission chain states.

3. The method of claim 2, wherein the switching is from the first transmission chain state to the second transmission chain state.

4. The method of claim 2, wherein the switching is from either the first transmission chain state or the second transmission chain state to the third transmission chain state.

5. The method of claim 1, wherein the first uplink carrier and the second uplink carrier are either time division duplexed (TDD) carriers or frequency division duplexed (FDD) carriers.

6. The method of claim 1, wherein the first uplink carrier is a low band and the second uplink carrier is a high band.

7. The method of claim 1, wherein receiving the indication comprises:

receiving an indication of the one of the plurality of transmission chain states.

8. The method of claim 1, wherein the switching occurs during a period in which the user equipment is not scheduled or configured to transmit.

9. The method of claim 1, wherein the indication is received based at least in part on a capability report from the user equipment, wherein the capability report identifies support for switching between at least two uplink transmission chain states of the plurality of transmission chain states.

10. A method for wireless communication by a network node, comprising:

transmitting, to a user equipment, an indication associated with switching a first transmission chain, and a second transmission chain, between a first uplink carrier and a second uplink carrier, to configure the first transmission chain and the second transmission chain in one of a plurality of transmission chain states, wherein the plurality of transmission chain states defines a quantity of transmission chains assigned to each of the first uplink carrier and the second uplink carrier, and wherein the plurality of transmission chain states includes at least two of:

a first transmission chain state in which both a first transmission chain and a second transmission chain are assigned to the first uplink carrier, a second transmission chain state in which both the first transmission chain and the second transmission chain are assigned to the second uplink carrier, or a third transmission chain state in which the first transmission chain is assigned to the first uplink carrier and the second transmission chain is assigned to the second uplink carrier; and receiving data according to the indication.

11. The method of claim 10, wherein the plurality of transmission chain states includes the first transmission chain state, the second transmission chain state, and the third transmission chain state.

12. The method of claim 11, wherein the switching is from the first transmission chain state to the second transmission chain state.

13. The method of claim 11, wherein the switching is from either the first transmission chain state or the second transmission chain state to the third transmission chain state.

14. The method of claim 10, wherein transmitting the indication comprises:

transmitting an indication of the one of the plurality of transmission chain states.

15. The method of claim 10, wherein the switching is to occur during a period in which the user equipment is not scheduled or configured to transmit.

16. A non-transitory computer-readable medium storing a set of instructions, the set of instructions comprising:

one or more instructions that, when executed by one or more processors of an apparatus, cause the apparatus to:

receive, from a network node, an indication associated with an uplink transmission;

switch, based at least in part on the indication, a first transmission chain and a second transmission chain between first uplink carrier and a second uplink carrier, to configure the first transmission chain and the second transmission chain in one of a plurality of transmission chain states, wherein the plurality of transmission chain states defines a quantity of transmission chains assigned to each of the first uplink carrier and the second uplink carrier, wherein the plurality of transmission chain states includes at least two of:

a first transmission chain state in which both the first transmission chain and the second transmission chain are assigned to the first uplink carrier, a second transmission chain state in which both the first transmission chain and the second transmission chain are assigned to the second uplink carrier, or a third transmission chain state in which the first transmission chain is assigned to the first uplink carrier and the second transmission chain is assigned to the second uplink carrier; and transmit, after the switching, data through the first transmission chain and the second transmission chain.

17. An apparatus for wireless communication, comprising a transceiver;

one or more memories comprising instructions; and one or more processors configured to execute the instructions to cause the apparatus to:

transmit, via the transceiver and to a user equipment, an indication associated with switching a first transmission chain, and a second transmission chain, between a first uplink carrier and a second uplink carrier, to configure the first transmission chain and the second transmission chain in one of a plurality of transmission chain states, wherein the plurality of transmission chain states defines a quantity of transmission chains assigned to each of the first uplink carrier and the second uplink carrier, and wherein the plurality of transmission chain states includes at least two of:

a first transmission chain state in which both a first transmission chain and a second transmission chain are assigned to the first uplink carrier, a second transmission chain state in which both the first transmission chain and the second transmission chain are assigned to the second uplink carrier, or a third transmission chain state in which the first transmission chain is assigned to the first uplink carrier and the second transmission chain is assigned to the second uplink carrier; and receive, via the transceiver, data according to the indication.

18. A user equipment, comprising:

one or more transceivers;

one or more memories comprising instructions; and one or more processors configured to execute the instructions to cause the user equipment to:

receive, via the one or more transceivers and from a network node, an indication associated with an uplink transmission;

switch, based at least in part on the indication, a first transmission chain and a second transmission chain, between a first uplink carrier and a second uplink carrier, to configure the first transmission chain and the second transmission chain in one of a plurality of transmission chain states, wherein the plurality of transmission chain states defines a quantity of transmission chains assigned to each of the first uplink carrier and the second uplink carrier, wherein the plurality of transmission chain states includes at least two of:

a first transmission chain state in which both the first transmission chain and the second transmission chain are assigned to the first uplink carrier, a second transmission chain state in which both the first transmission chain and the second transmission chain are assigned to the second uplink carrier, or a third transmission chain state in which the first transmission chain is assigned to the first uplink carrier and the second transmission chain is assigned to the second uplink carrier; and transmit, via the one or more transceivers and after the switching, data through the first transmission chain and the second transmission chain.

19. The user equipment of claim 18,
wherein the switching is between different transmission chain states of the plurality of transmission chain states.

20. The user equipment of claim 19,
wherein the switching is from the first transmission chain state to the second transmission chain state.

21. The user equipment of claim 19,
wherein the switching is from either the first transmission chain state or the second transmission chain state to the third transmission chain state.

22. The user equipment of claim 18,
wherein the first transmission chain and the second transmission chain support up to rank 1 or up to rank 2 transmissions.

23. The user equipment of claim 18,
wherein the first uplink carrier and the second uplink carrier are either time division duplexed (TDD) carriers or frequency division duplexed (FDD) carriers.

24. The user equipment of claim 18, wherein, to receive the indication, the one or more processors are configured to cause the user equipment to:
receive an indication of the one of the plurality of transmission chain states.

25. The user equipment of claim 18, wherein the switching occurs during a period in which the user equipment is not scheduled or configured to transmit.

26. The user equipment of claim 18,
wherein the indication is received based at least in part on a capability report from the user equipment, wherein the capability report identifies support for switching between at least two uplink transmission chain states of the plurality of transmission chain states.

\* \* \* \* \*